Nov. 10, 1953  J. J. MOYNIHAN  2,658,607
CONVEYER BELT

Filed Jan. 2, 1948  2 Sheets-Sheet 1

John J Moynihan INVENTOR.

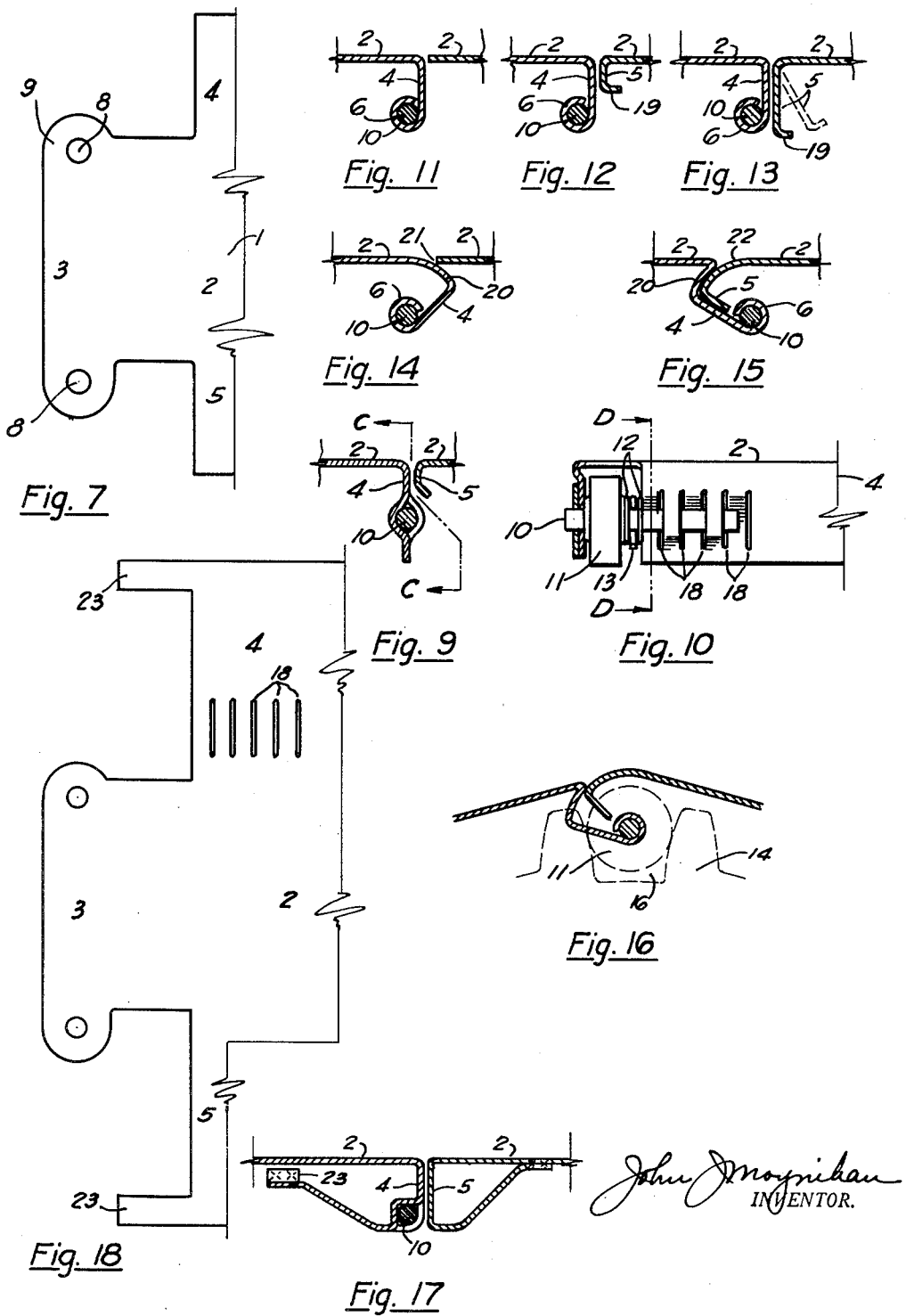

Patented Nov. 10, 1953

2,658,607

UNITED STATES PATENT OFFICE 2,658,607

CONVEYER BELT

John J. Moynihan, Chicago, Ill., assignor to Stavineer Corporation, a corporation of Illinois Application January 2, 1948, Serial No. 316

6 Claims. (Cl. 198—189)

This invention relates to conveyors, and particularly to that class of conveyors which includes a sheet metal linked-belt as the conveying element. My invention may be considered to be an improvement on the type of conveyor shown in U. S. Patent #2,430,720, issued November 11, 1947 to D. Kline, et al.

The conveyor construction taught by Kline in the above mentioned patent, is subject to some disadvantages which are eliminated in my invention. The principal disadvantage is the tendency of the sheet metal links to elongate under load so that the pitch of the tubular channels varies as a function on the load of the conveyor. This variation in pitch may cause trouble due to the failure of the tubular channels to engage the recesses in the driver.

Furthermore, even if the load on the belt is not sufficient to stretch the belt assembly to a point where the tubular channels fail to engage the recesses in the driver, the driver recesses and the tubular channel portions are subject to increased wear on account of the fact that their mutual engagement is accomplished with a sliding motion rather than with a pure rolling motion such as has been found desirable in gear and chain driving systems in general.

I avoid the stretching of the belt assembly by providing an integral element of the conveyor link which is stressed very nearly in pure tension in the operation of the conveyor.

I avoid the rubbing action on the engagement of the tubular channels with the driver by driving the conveyor externally to the width of the tubular channel, and by including a driving roller as the engagement element on the belt.

These advantages are secured at very little cost over the cost of a conveyor belt as disclosed in Kline's patent.

Referring to the attached drawings, Fig. 1 is a side elevation of one of the flight links that make up the belt element in my conveyor.

Fig. 7 is a development of one end of the sheet metal strip which is used to make the flights shown in Figs. 1, 2, and 3;

Figure 3:
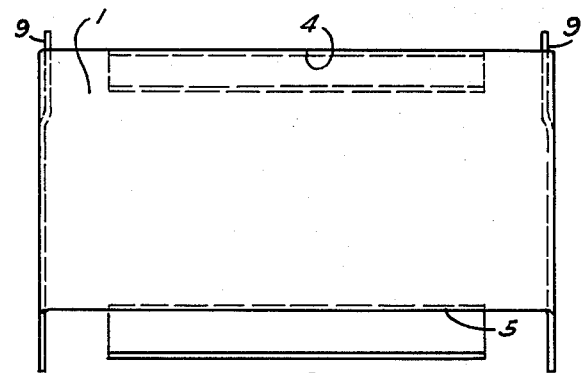
Fig. 3 is a plan view of the link shown in Figs. 1 and 2.
Figures 1, 2:
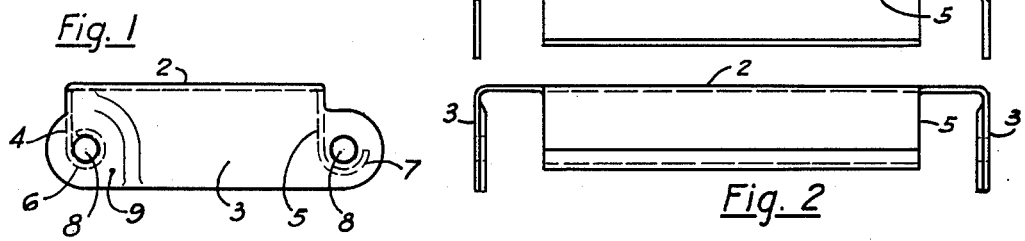
Fig. 2 is an end elevation of the same link shown in Fig. 1, taken in the direction of motion of the belt.

Referring to Figs. 1, 2, and 3, it will be seen that a flat sheet of metal 1 of suitable width and length, has been formed into a boxlike structure having a rectangular upper surface 2 and depending sides 3, 3, 4, and 5.

Depending side 4 is formed into a tubular channel at its lower end. Tubular channel 6 is preferably circular in cross-section, and is also preferably substantially closed upon itself. Depending side 5 terminates in a channel structure 7, substantially semi-circular in extent, and having a radius on the concave side of the semicircle substantially equal to the outside radius of tubular channel 6 on depending side 4. Depending side 3 will normally be deeper than the overall height of sides 4 and 5 after the latter have been curled into the shape above described. Sides 3, 3 are provided with holes 8, 8 substantially concentric with the axes of tubular channel members 6 and 7.

The portions of side 3 in the vicinity of one of the holes 8 is off-set from the plane of the remainder of side 3 by an amount substantially equal to the thickness of the material from which the flight link is made. The zone in which this off-set occurs is indicated by the numeral 9 in Fig. 1.

Reference to Fig. 7 will show by numerals corresponding to those used in Figs. 1, 2, and 3, the portions of the blank development which are later formed into the flight link of Figs. 1, 2, and 3.

The flight link above described, consisting as it does of channel sections at right angles to one another, possesses a good moment of inertia and section modulus, and is consequently quite rigid with reference to loads imposed on the upper surface 2.

Figures 4, 5:
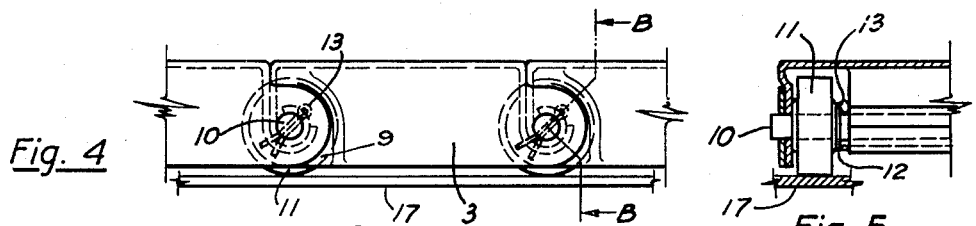
Fig. 4 is a side elevation of a joint between two adjacent links.
Fig. 5 is an end elevation taken in the direction of motion in the belt, for the joint shown in Fig. 4.
Figure 6:
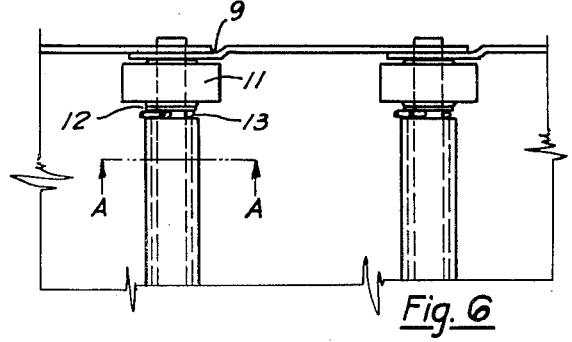
Fig. 6 is a plan view from below, showing portions of two adjacent joints on the type shown in Figs. 4 and 5.

In addition, the off-set zone 9 on sides 3 permits links of identical construction to be telescoped one within the other as shown in Figs. 4, 5, and 6 where a pin 10 having a diameter substantially equal to the inside diameter of tubular channel 6 has been passed through holes 8, 8 in two adjacent telescoping flight links, thereby coupling the links and enabling them to become a part of a tensionally loaded belt. In the gap between the inside surfaces of depending sides 3 and the ends of tubular channels 6 and 7 a cylindrical roller 11 is located, mounted concentrically with and adapted to turn on pin 10. Pin 10 may be continuous across the entire width of the flight, or may alternatively consist of a plurality of short lengths of pin, engaging only a limited length of tubular channel 6 in the vicinity of roller 11.

Rollers 11 serve two functions in my design: They are the driving members which engage the driving sprocket; and they also act as a low-friction support for the belt structure between the driving end and the take-up end of the conveyor. For this purpose they are permitted to rest on a longitudinal rail or substructure as indicated at 17 in Figs. 4 and 5.

Rollers 11 may be bushed with bronze or antifriction bearings, if desired. Washers 12 are provided, if necessary, to reduce end thrust friction.

Pin 10 may be retained in position axially in any of several ways well known in the art, as for example, by means of cotter pins 13 passing through the body of the pin.

Figure 8:
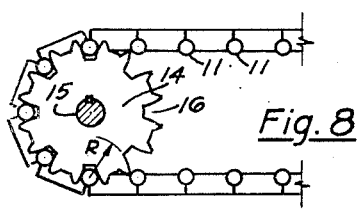
Fig. 8 is a schematic diagram of the method of driving a belt composed of links as shown in Figs. 1, 2, and 3.

A belt assembled from links, rollers, and pins, as above described, may be driven by means of a sprocket 14 mounted on a drive shaft 15 as shown in Fig. 8. Sprocket 14 is provided with pockets 16 into which rollers are caused to drop and the sprocket revolves. The flanks of pocket 16 are shaped in the form of an arc of a circle the center of which corresponds to the axis of roller 11 when in position in an adjacent pocket.

From the above description of my invention it will be seen that I have provided a flight conveyor structure the overall width of which is not substantially greater than the useful width of the top surface 2 of the flights.

It will also be apparent that the use of depending sides 3 to form a tensionally loaded link, affords a substantial measure of protection against the tendency of the links described by Kline in #2,430,720 to elongate in pitch under tensile load.

Furthermore, the integral construction including top surface 2, depending sides 4 and 5, and depending sides 3,3, provides a stiff structural design which may be attained economically.

My construction also permits of easy variation in the flight width (indicated in Fig. 3), by merely modifying the length of blank in the operation of parting the stock from which the flight blanks are made.

In addition, most of the advantages of the conveyor system described in U. S. Patent #2,430,720 are retained.

The construction of the conveyor belt is not limited to the design shown in Figs. 1 to 7. It may be modified in many ways, depending on the particular local conditions involved without departing from the spirit of my invention.

For example, if in the operation of the belt shown in Figs. 1 to 7, it appears that there is danger that small parts may fall into the V-shaped notch formed by depending sides 4 and 5 as they pass over the driver on take-up sprockets, and which later may be clamped in the notch as the belt links straighten out into a straight belt, with consequent damage to the hinged joints formed by portions 6 and 7 of the link, depending side 5 may be modified to avoid this occurrence. Furthermore, the method by which pin 10 is positioned by depending side 4 need not be confined to a tubular channel as shown in Figs. 1 to 7.

Referring to the second sheet of the attached drawings, Fig. 9 is a section through a link joint using another method of positioning pin 10;

Fig. 10 is a partial section taken transversely to the direction of the motion to the belt, showing the pin-positioning means of Fig. 9 in elevation;

Figs. 11-12-13-14-15-and 16 are partial sectional drawings of joints made to meet various specific local requirements;

Fig. 17 is a sectional view of a joint showing means of increasing the rigidity of the flight member without sacrificing the advantages shown in Figs. 9 and 10; and Fig. 18 is a development of one of the sides of the joint shown in Fig. 17.

Referring to Figs. 9 and 10, depending side 4 is pierced at several points 18, 18, and the sheet material between adjacent piercings is deformed alternately on either side of the plane of 4, so that pin 10 may be interlaced, as it were, in the structure provided, and may be retained in position. If desired, pin 10 may be provided with a groove at some point along its length, the said groove being sufficiently wide to permit one of the sheet material elements between adjacent piercings to enter, and thus retain pin 10 against axial movement; alternatively, a cotter-pin 13 may be used as described in connection with Fig. 5.

Referring to Fig. 11 an alternative construction is shown, the view being taken along line A—A of Fig. 6. This construction is adaptable particularly to cases in which the pitch of the link, that is, the distance from one pin to the corresponding pin in the next adjacent link, is relatively small, and at the same time there is no objection to a gap being formed between the surfaces 2 of adjacent links as they move around the sprockets. Because of the relatively small length of such links, the depending side 4 and the pin retaining construction such as the tubular channel 6 will provide all of the moment of inertia which is necessary for such services. It will be seen that such a link has depending elements on only three sides of its periphery.

Referring to Fig. 12, a construction is shown in which a larger moment of inertia is desired than that shown in Fig. 11, but in which particular local conditions make it unnecessary to take into consideration the effect of a gap between surfaces 2, 2 as the links pass around the sprocket. Here depending side 5 terminates in a simple right angle bend of relatively short length 19.

Referring to Fig. 13, a construction is shown having a moment of inertia greater than the construction shown in Figs. 11 and 12, and approximately equal to that of the construction shown in Figs. 1, 2, and 3. Here, however, provision has been made to avoid damage to the link joint caused by the possible entrance of foreign materials as the joint surfaces 4 and 5 open in going around the sprockets. It will be seen that while depending side 5 of Fig. 13 is sufficiently long to prevent material which might enter the link joint from passing directly through the belt, there is no semi-tubular channel 7 provided to enclose the pin-retaining channel 6; consequently, any material falling into the V-notch while the belt is passing around a sprocket will, if it does not fall out of the V-notch, merely bend element 5 backward as shown in the dotted lines, and will not jam the conveyor or damage the joint.

The construction shown in Fig. 14 is intended for conveyors which do not require the increased moment of inertia provided by depending element 5, but in which it is desired that the belt joints be secure in all positions of the belt against the entrance of foreign material. In the construction shown in Fig. 14 the portion of depending element 4 immediately adjacent to surface element 2 is of arcuate form, indicated here by numeral 20, the center of the arc being the axis of pin 10. The edge of the surface element 2 of the adjacent flight member is arranged to cooperate closely with the arcuate portion 20 leaving only a very small gap 21 between adjacent flight members. Alternatively, if the flexibility of surface 2 permits, it may be allowed to bear against arcuate portion 20, with no clearance at the point indicated by numeral 21.

Fig. 15 shows an alternative construction to that employed in Fig. 14, in which an arcuate section 22 is interposed between surface element 2 and depending element, to provide a higher moment of inertia at this edge of the flight members.

Fig. 16 shows the construction of Fig. 15 in position on a sprocket 16. It will be appreciated that the angular dimensions of the arcuate portion of the depending elements will depend on the number of teeth in the sprocket, since the movement of the belt over the sprocket will, in general, require the greatest angular motion of the joint.

Figs. 17 and 18 are alternative constructions to those previously shown, and are intended for conveyor belts which require a greater degree of stiffness than that provided by depending elements 4 and 5 when the lateral edge of the latter are unsupported. In Fig. 17 a construction is shown involving the retention of pin 10 by the means disclosed in Fig. 10, but in which depending element 4 is continued substantially beyond the point of support for the pin, and the outboard edge is bent back toward surface element 2 and anchored to depending side 3 by means of an integral tab 23. The sheet development required for this construction is shown in Fig. 18. Alternatively, the outboard edge of depending elements 4 and 5 may be secured, as by spot-welding, to surface element 2. This construction is shown in Fig. 17 in connection with side 5 of an adjacent link, and the blanks required for this construction will have the same shape as Fig. 7. The reason for bringing the outboard edge of depending element 4 up toward surface element 2 is to avoid interference with the outside diameter of the sprocket. No such limitation holds for the construction made from a blank like that shown in Fig. 7.

It will be seen that my invention provides a conveyor construction adapted to many diverse requirements in the conveyor field, and one by which I am able to compromise the various design requirements and the production cost thereof so as to provide a conveyor of minimum cost for the particular local requirements.

In the following claims, the expression "conveyor" is intended to include a machine having no removable load on the belt member, as well as a machine adapted to carry a removable load on the belt member.

I claim:

1. A conveyor system including a conveyor belt, said conveyor belt including a plurality of flight members, pins, and rollers; each of said flight members including a plane substantially rectangular sheet metal surface element and integral peripheral dependent elements formed at least in part by deforming selected peripheral portions of a sheet metal blank out of the plane of the said surface element; a first of said dependent elements being transverse to the direction of motion of the belt and being further formed into means adapted to receive at least one of said pins; further dependent elements arranged oppositely to one another and longitudinal to the direction of motion of the belt, said further dependent elements being offset to the plane of said surface element on the same side as said first element; said further elements being perforate coaxially with said pin-receiving means; said pins being located simultaneously within the perforations in said further elements and within the said pin-receiving means; and said rollers being rotatably mounted on said pins between said further dependent elements and said pin-receiving means.

2. A conveyor system including a conveyor belt, said conveyor belt including a plurality of flight members, pins, and rollers; each of said flight members comprising a plane substantially rectangular sheet metal surface element and integral peripheral dependent elements substantially at right angles to said surface element; a first of said dependent elements being transverse to the direction of motion of the belt and including a tubular channel having its axis parallel to said surface element; further dependent elements arranged oppositely to one another and longitudinal to the direction of motion of the belt, said further dependent elements being offset to the plane of said surface element on the same side as said first element; said further elements being perforate coaxially with said tubular channel; said pins being located simultaneously within the perforations in said further elements and within the said tubular channels; and said rollers being rotatably mounted on said pins between said further dependent elements and said tubular channels.

3. A conveyor system including a conveyor belt, said conveyor belt including a plurality of flight members, pins, and rollers; each of said flight members comprising a plane substantially rectangular sheet metal surface element and integral peripheral dependent elements substantially at right angles to said surface element; a first of said dependent elements being transverse to the direction of motion of the belt and including a tubular channel at its outboard edge, the axis of said channel being parallel to said surface element; a second of said dependent elements situated opposite to said first dependent element and adapted to cooperate closely with the first dependent element of an adjacent flight member; further dependent elements arranged oppositely to one another and longitudinal to the direction of motion of the belt, the outboard edges of said further dependent elements being on the same side of said surface element as said first and second dependent elements; said further elements being perforate coaxially with said tubular channel; said pins being located simultaneously within the said perforations and within the said tubular channels; and said rollers being rotatably mounted on said pin between said further dependent elements and said tubular channels.

4. A conveyor system including a conveyor belt, said conveyor belt including a plurality of flight members, pins, and rollers; each of said flight members comprising a plane substantially rectangular sheet metal surface element and integral peripheral dependent elements substantially at right angles to said surface element; a first of said dependent elements being transverse to the direction of motion of the belt and including a tubular channel having its axis parallel to said surface element; a second of said dependent elements situate opposite to said first dependent element and including a semi-tubular section adapted to at least partially contain the tubular channel of the first dependent element of an adjacent flight member, further dependent elements arranged oppositely to one another and longitudinal to the direction of motion of the belt, said further dependent elements being offset to the plane of said surface element on the same side as said first and second elements; said further elements being perforate coaxially with said tubular channel; said pins being located simultaneously within the perforations in said further elements and within the said tubular channels; and said rollers being rotatably mounted on said pins between said further dependent elements and said tubular channels.

5. A conveyor system including the conveyor belt of claim 1 and at least one driver, said driver having peripheral recesses spaced to accommodate successive rollers in the said belt and to transmit movement from said driver to said belt through the engagement of said rollers within said recesses.

6. The system of claim 5 wherein said rollers are utilized for at least a portion of their travel external to said driver recesses as wheel means for supporting a portion of the conveyed load.

JOHN J. MOYNIHAN.

References Cited in the file of this patent

UNITED STATES PATENTS

| Number | Name | Date |
|---|---|---|
| 1,026,617 | Turnbull | May 14, 1912 |
| 1,120,961 | Morse | Dec. 15, 1914 |
| 1,377,450 | Whipple | May 10, 1921 |
| 1,394,980 | Dull | Oct. 25, 1921 |
| 1,836,422 | Woodman | Dec. 15, 1931 |
| 1,931,531 | Falkiner | Oct. 24, 1933 |
| 2,222,025 | Fischer | Nov. 19, 1940 |
| 2,243,145 | Batchell | May 27, 1941 |
| 2,430,720 | Kline | Nov. 11, 1947 |
| 2,564,533 | Imse | Aug. 14, 1951 |

FOREIGN PATENTS

| Number | Country | Date |
|---|---|---|
| 19,810 | Great Britain | Sept. 15, 1903 |
| 513,612 | Great Britain | Oct. 17, 1939 |